(12) United States Patent
Langner

(10) Patent No.: US 11,058,244 B2
(45) Date of Patent: Jul. 13, 2021

(54) CUSTOMIZABLE FOOTWEAR RACK

(71) Applicant: Marna Langner, Westbank (CA)

(72) Inventor: Marna Langner, Westbank (CA)

( * ) Notice: Subject to any disclaimer, the term of this patent is extended or adjusted under 35 U.S.C. 154(b) by 34 days.

(21) Appl. No.: 16/356,929

(22) Filed: Mar. 18, 2019

(65) Prior Publication Data
US 2019/0282010 A1  Sep. 19, 2019

Related U.S. Application Data

(60) Provisional application No. 62/644,269, filed on Mar. 16, 2018.

(51) Int. Cl.
*A47G 25/00* (2006.01)
*F16B 2/18* (2006.01)

(52) U.S. Cl.
CPC ............ *A47G 25/005* (2013.01); *F16B 2/18* (2013.01); *Y10T 24/3457* (2015.01)

(58) Field of Classification Search
CPC ............. Y10T 24/3457; Y10T 24/3433; Y10T 24/3431; Y10T 24/3439; Y10T 24/3453; Y10T 24/3456; Y10T 24/3449; A47G 25/005; A47F 7/08; A47B 61/04
USPC ............ 248/451, 452, 113, 339, 340, 316.7, 248/316.5, 316.3, 316.2, 316.6
See application file for complete search history.

(56) References Cited

U.S. PATENT DOCUMENTS

| | | | | |
|---|---|---|---|---|
| 1,423,952 A | * | 7/1922 | McCracken | B65H 29/003 198/685 |
| 1,944,610 A | * | 1/1934 | Person | A47K 10/12 24/328 |
| 2,941,669 A | | 6/1960 | Palay | |
| 3,960,264 A | * | 6/1976 | Carbine | B65G 17/323 198/687.1 |
| 4,603,777 A | * | 8/1986 | Pearl | B65G 19/025 198/803.8 |
| 4,878,577 A | * | 11/1989 | Romero Lledo | A47G 25/487 198/803.9 |

(Continued)

FOREIGN PATENT DOCUMENTS

GB    2343374 A2    5/2000

OTHER PUBLICATIONS (Author Unknown) Photograph of clothes hanger discovered at bed and breakfast in Japan. Photograph taken Feb. 16, 2019.

*Primary Examiner* — Robert Sandy
(74) *Attorney, Agent, or Firm* — Oyen Wiggs Green & Mutala LLP

(57) ABSTRACT

A footwear rack and clasp for storing footwear are provided. The clasp comprises a hook, a plurality of coplanar arms downwardly extending from the hook, and at least one tong. The tong is pivotally coupled to a first coplanar arm and extendable across an opening defined by the first coplanar arm and an adjacent second coplanar arm to engage the second coplanar arm. A biasing force exerted by the tong on an article to be hung is increased proportionally as the weight of the article increases. The footwear rack comprises a vertical post supporting a plurality of removeable footwear support arms and a plurality of clasps removably attachable to the arms. Each support arm extends in a direction that is generally perpendicular to a longitudinal axis defined by the post. Each support arm may comprise a tongue configured to engage a groove defined by a surface of the post.

11 Claims, 24 Drawing Sheets

(56) References Cited

U.S. PATENT DOCUMENTS

| | | | |
|---|---|---|---|
| 5,127,528 A | | 7/1992 | Cone |
| D342,612 S | | 12/1993 | McIntyre |
| 5,282,553 A | | 2/1994 | Ibled |
| 5,911,347 A | | 6/1999 | Jackstat et al. |
| 6,086,126 A | * | 7/2000 | Krauss .................. B65G 47/90 |
| | | | 294/104 |
| 9,138,092 B2 | | 9/2015 | Wright et al. |
| 2008/0116235 A1 | | 5/2008 | Zamzow |
| 2009/0127215 A1 | | 5/2009 | Gale |
| 2009/0166303 A1 | | 7/2009 | Chiang |
| 2012/0048816 A1 | | 3/2012 | Brown |

* cited by examiner

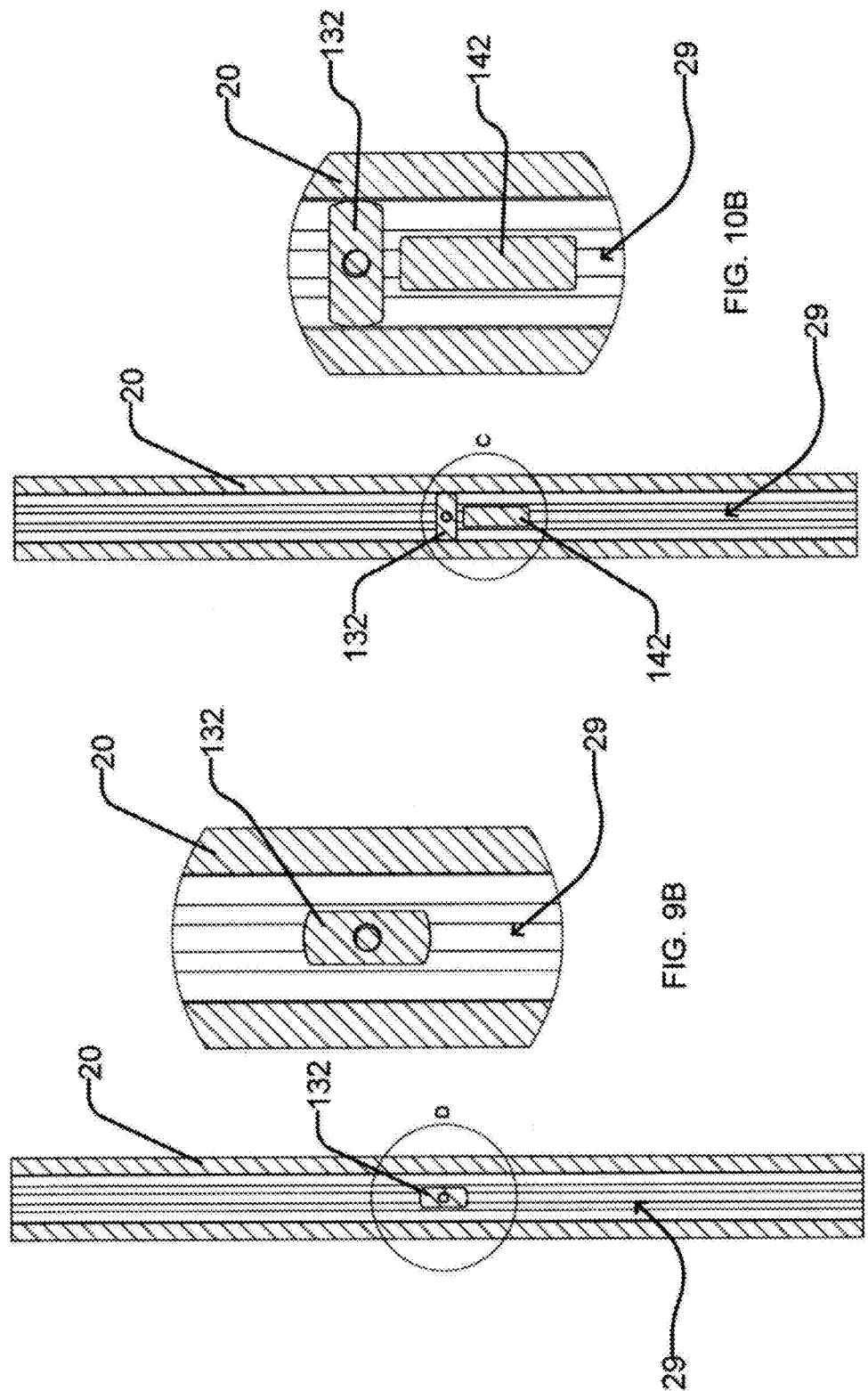

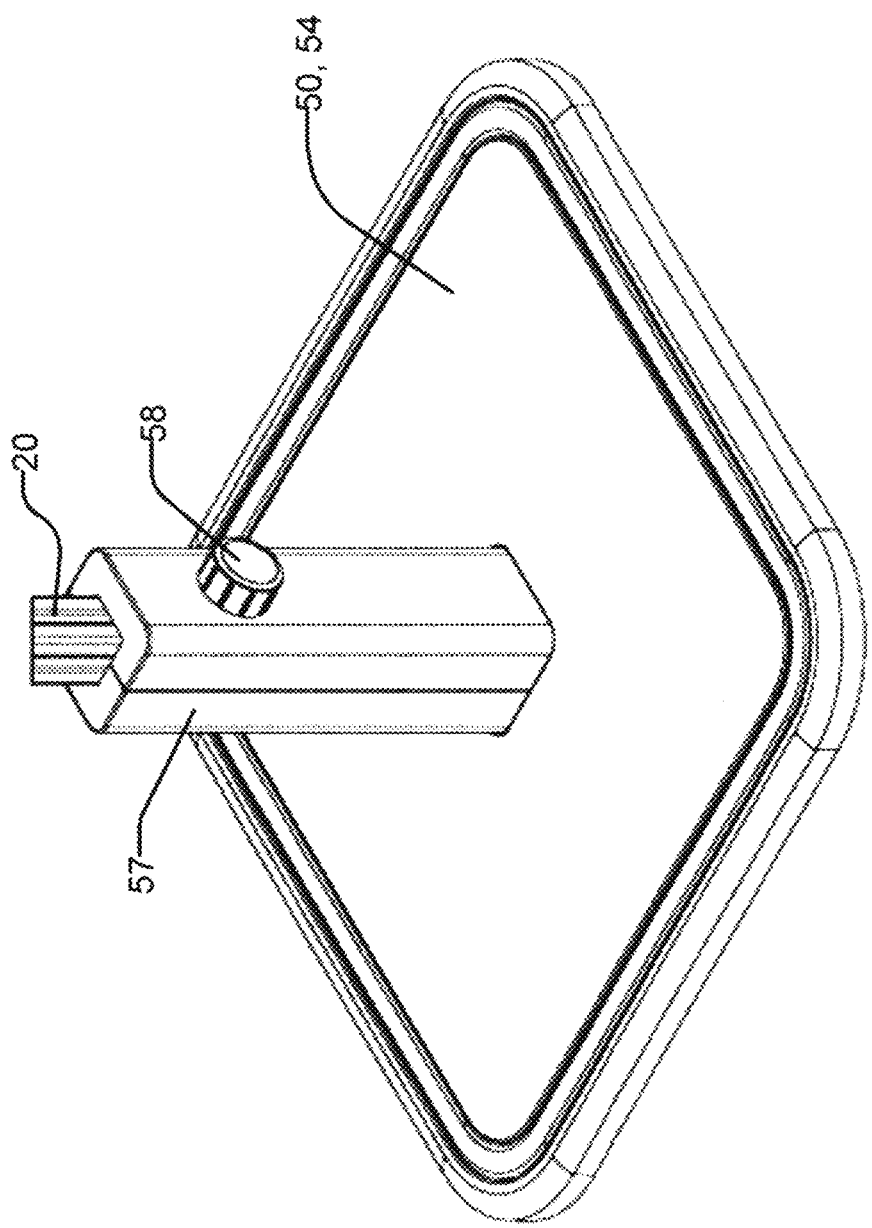

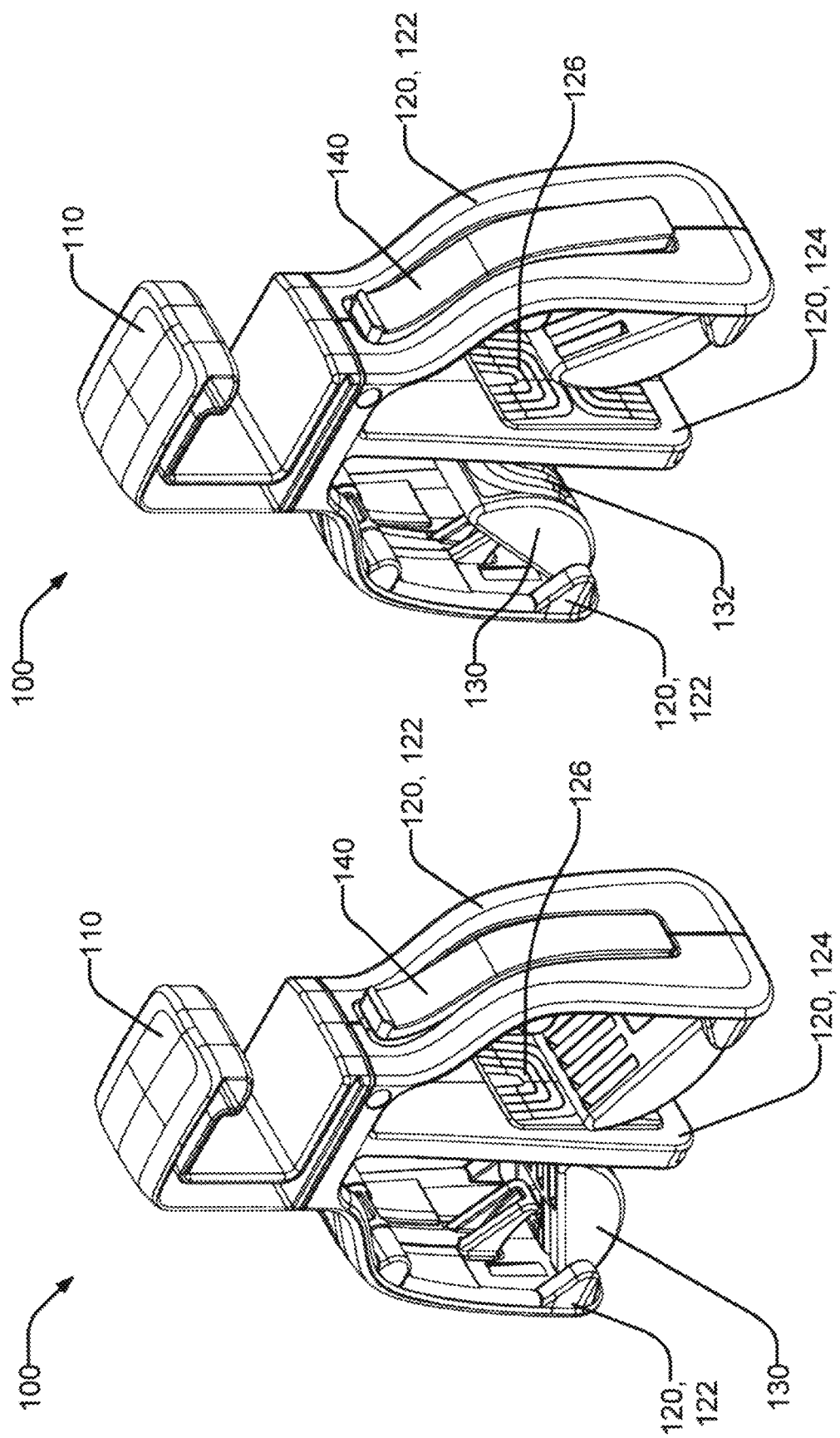

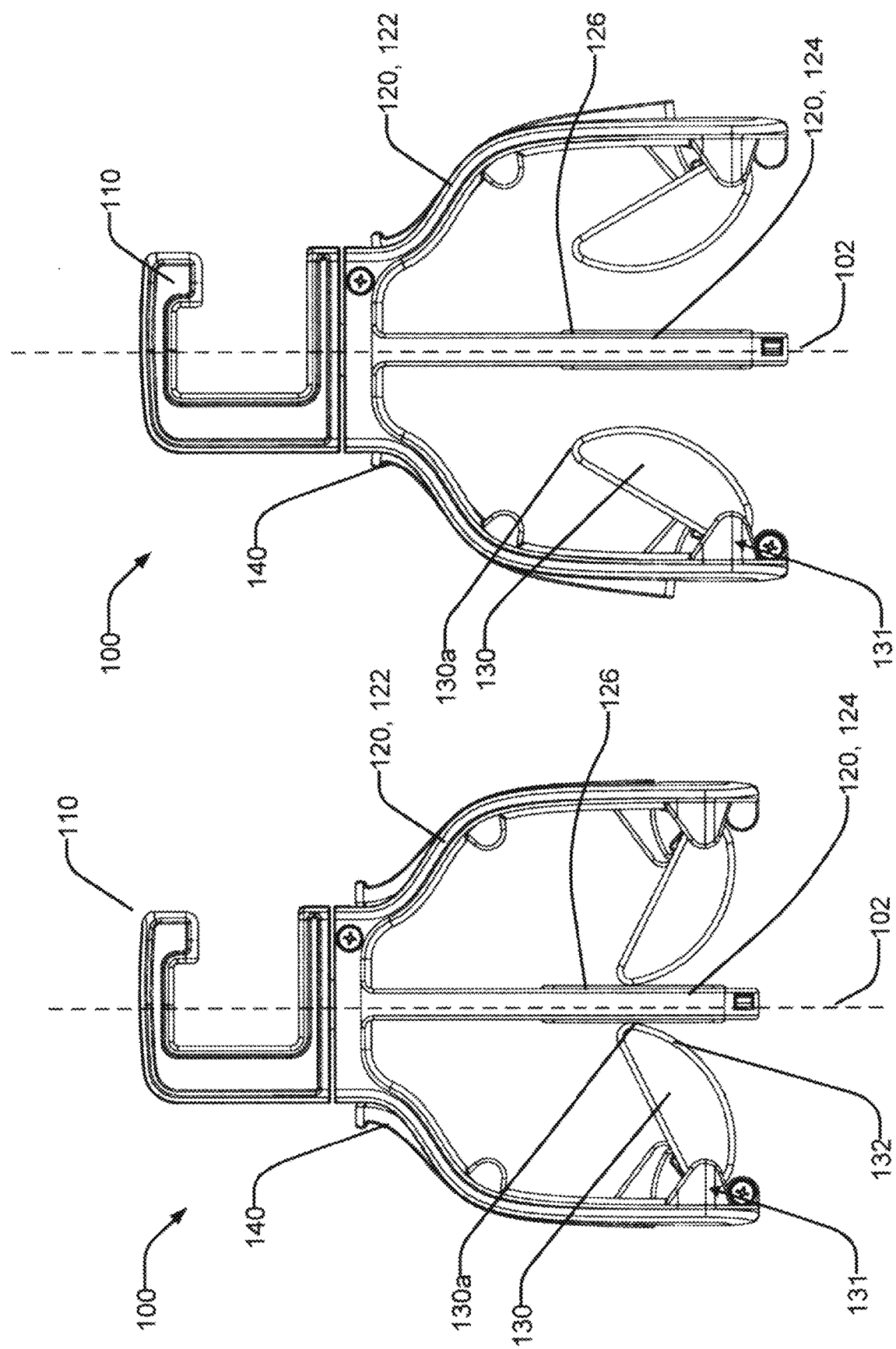

CUSTOMIZABLE FOOTWEAR RACK

CROSS-REFERENCE TO RELATED APPLICATIONS

This application claims priority to U.S. Provisional Patent Application No. 62/644,269, filed on Mar. 16, 2018, entitled "CUSTOMIZABLE FOOTWEAR RACK", which is incorporated by reference in its entirety.

TECHNICAL FIELD

The present invention relates to footwear racks, and in particular to customizable footwear racks for storing a variety of footwear without damaging the footwear.

BACKGROUND

Footwear storage is necessary in most homes, since footwear can become damaged, dirty, or misplaced if not stored properly. Various racks, cabinets, and organizers are known for storing footwear. Many of these systems take up large amounts of space or crush and damage footwear in an attempt to save space.

There is a general desire for footwear racks that are adjustable and customizable for storing and protecting a variety of footwear without occupying a vast amount of space or damaging the footwear.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements.

The present invention relates to customizable and adjustable footwear racks and clasps for storing and protecting footwear. The clasp prevents or minimizes damage to an article secured to the clasp.

The present invention has a number of aspects. One aspect of the invention provides a clasp comprising a hook, a plurality of coplanar arms downwardly extending from the hook, and at least one tong. The tong is pivotally coupled to a first coplanar arm and extendable across an opening defined by the first coplanar arm and an adjacent second coplanar arm to engage the second coplanar arm.

In some embodiments, the clasp is interchangeable between an open position and a closed position by pivoting the tong across the opening. In the open position, the clasp may be aligned to secure an article to be hanged. In the closed position, the tong secures the article to the second coplanar arm using a biasing force.

In some embodiments, the biasing force exerted by the tong on the article is increased proportionally as the weight of the article increases.

In some embodiments, the clasp comprises a locking mechanism for securing the clasp in the open position and/or the closed position.

In some embodiments, the coplanar arms may be rotated 360° about a longitudinal axis defined by the hook.

Another aspect of the present provides a footwear rack comprising a vertical post supporting a plurality of removeable footwear support arms and a plurality of clasps removably attachable to the footwear support arms. Each footwear support arm extends in a direction that is generally perpendicular to a longitudinal axis defined by the post.

In some embodiments, the post comprises a plurality of modular and interconnectable pieces for adjusting the height of the rack.

In some embodiments, the rack further comprises a base defining a support for receiving the post. The support includes a mechanism for adjusting the height of the rack by moving the post vertically within the support.

In some embodiments, each footwear support arm comprises a tongue extending from an end thereof. The tongue is configured to engage a groove defined by and extending longitudinally along at least one surface of the post.

In some embodiments, each footwear support arm is secured to the post by inserting the tongue inside the groove and rotating the footwear support arm 90° to engage the tongue and groove and secure the footwear support arm to the post in a locked position.

in some embodiments, each footwear support arm is securable at any position along the length of the post.

In some embodiments, the connector has an S-shaped configuration and the slots defined by the connector provide an outward spring biasing force to the connector when the footwear support arm is engaged with the post in the locked position.

In some embodiments, the rack further comprises an end cap configured to engage a closet rail to secure the post in an upright, vertical position.

Another aspect of the present invention provides a footwear rack comprising a vertical post supporting a plurality of removable footwear support arms. Each footwear support arm extends in a direction that is generally perpendicular to a longitudinal axis defined by the post. Each footwear support arm comprises a tongue extending from an end thereof, the tongue configured to engage a groove defined by and extending longitudinally along at least one surface of the post.

In some embodiments, each footwear support arm is securable at any position along the length of the post.

In some embodiments, each footwear support arm is secured to the post by inserting the tongue inside the groove and rotating the footwear support arm 90° to engage the tongue and groove and secure the footwear support arm to the post in a locked position.

In some embodiments, the connector has an S-shaped configuration and the slots defined by the connector provide an outward spring biasing force to the connector when the footwear support arm is engaged with the post in the locked position.

In some embodiments, the rack further comprises a plurality of clasps removably attachable to the footwear support arms.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 9A is a partial cross-sectional view of the rack shown in FIG. 4 taken along the line A-A.

FIG. 9B is a partial view of the rack shown in FIG. 9A taken of section D.

FIG. 10A is a partial cross-sectional view of the rack shown in FIG. 7 taken along the line B-B.

FIG. 10B is a partial view of the rack shown in FIG. 10A taken of section C.

FIG. 18 is a front, side perspective view of a base of the rack shown in FIG. 1.

FIG. 23 is a perspective view of a footwear rack according to an example embodiment of the present invention installed in a custom closet.

FIG. 30A is a front, side perspective view of a clasp according to an example embodiment of the present invention, wherein the clasp is in a closed position.

FIG. 30B is a front, side perspective view of the clasp shown in FIG. 30B, wherein the clasp is in an open position.

FIG. 31A is a front elevation view of the clasp shown in FIG. 30A.

FIG. 31B is a front elevation view of the clasp shown in FIG. 30B.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

The present invention provides a footwear rack for storing and protecting a variety of footwear (e.g. shoes, boots, sandals, heels, slippers, athletic shoes and boots such as snowboard boots, skates, cleats, hip waders, etc.). In some embodiments, the footwear rack is customizable, modular, and adjustable. The footwear rack may be freestanding or built into existing storage space (e.g. a closet). The footwear rack may be designed and assembled to accommodate existing storage space (e.g. a closet) of known dimensions. Footwear may be hung from the rack using a clasp that does not damage the footwear.

Figure 1:
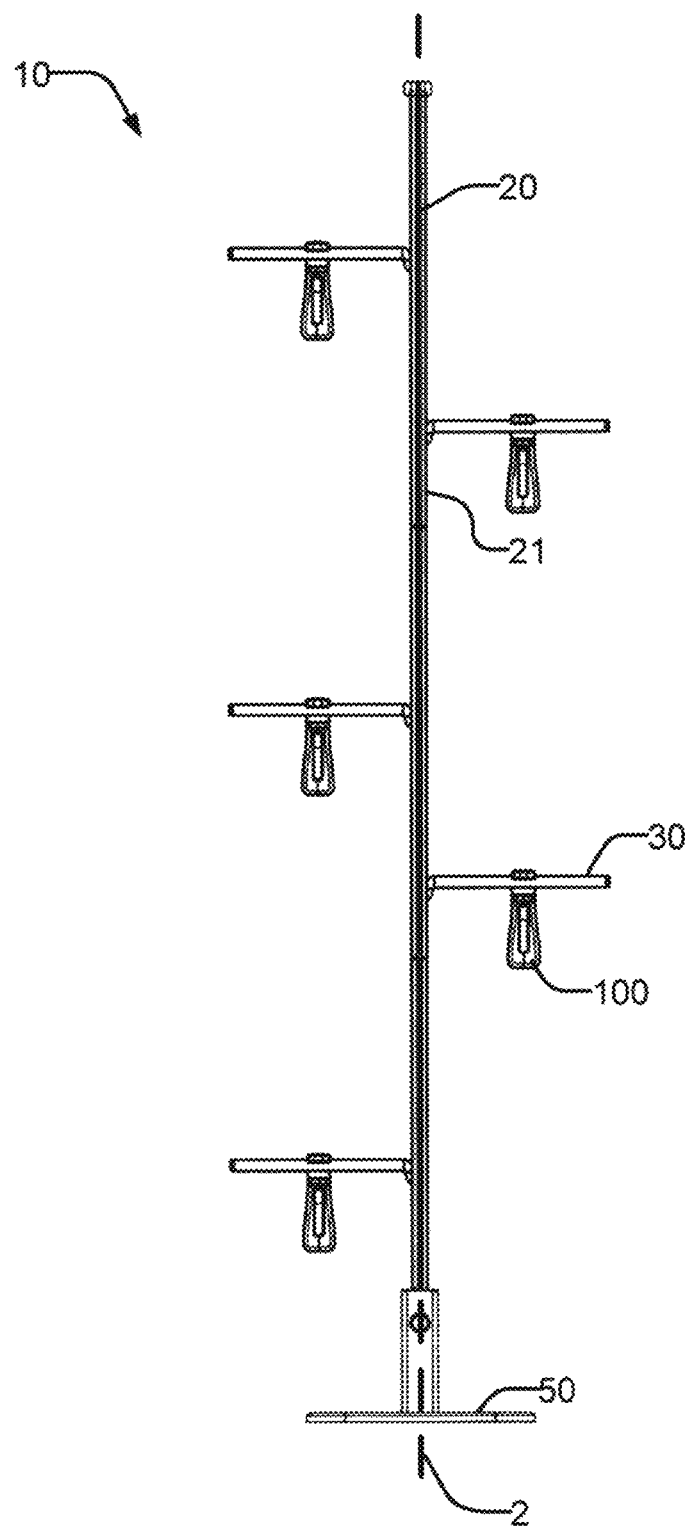
FIG. 1 is a front elevation view of a footwear rack according to an example embodiment of the present invention.
Figure 2:
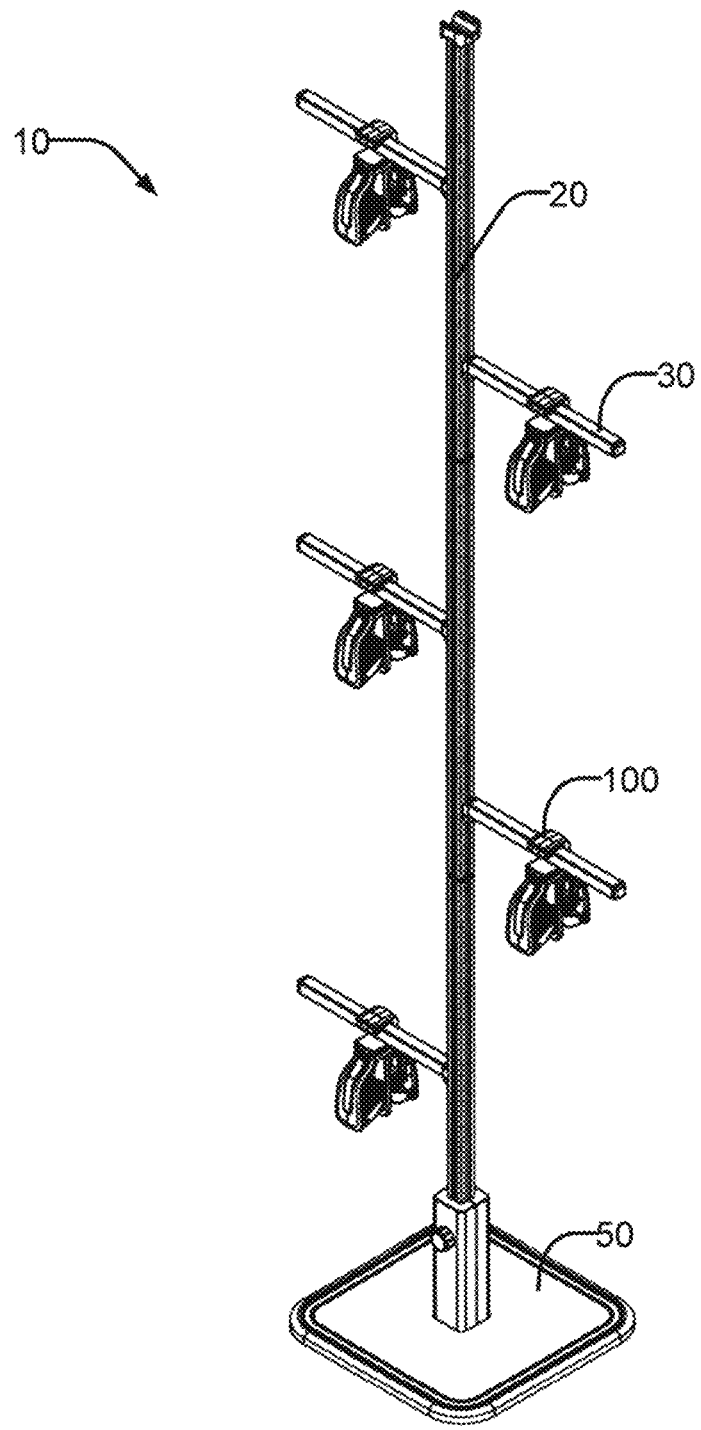
FIG. 2 is a front, side perspective view of the rack shown in FIG. 1.
Figure 3:
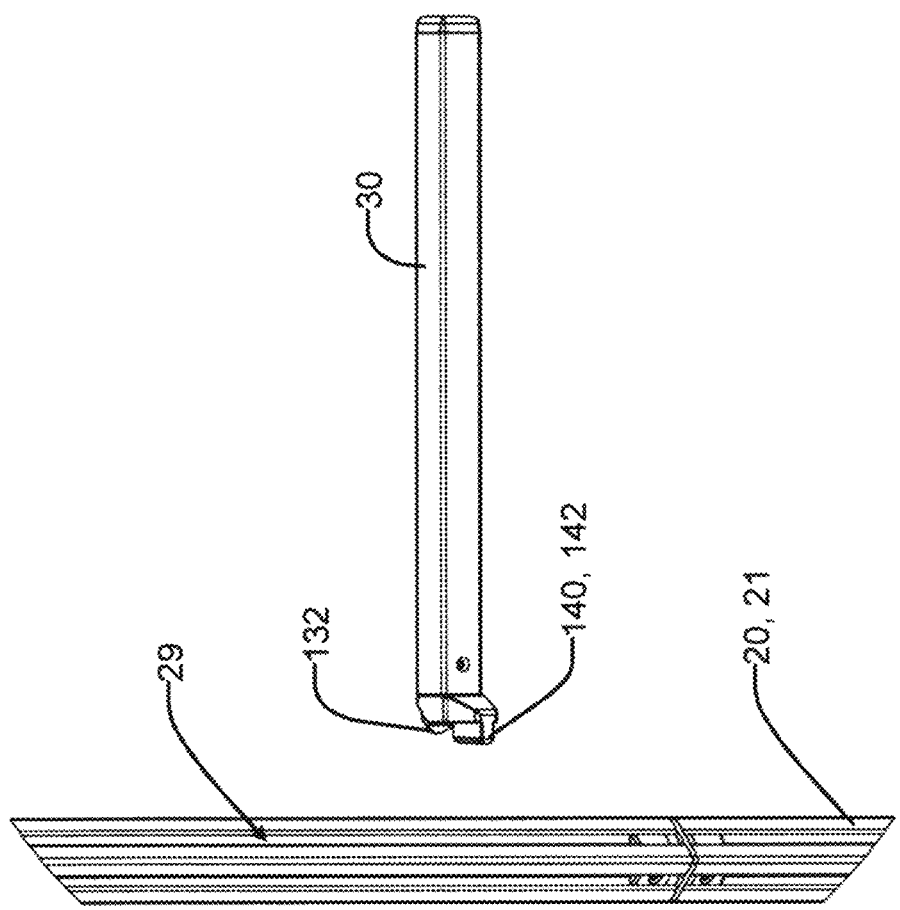
FIG. 3 is a partial side perspective view of the rack shown in FIG. 1, wherein a footwear support arm is detached from a vertical post.
Figure 5:
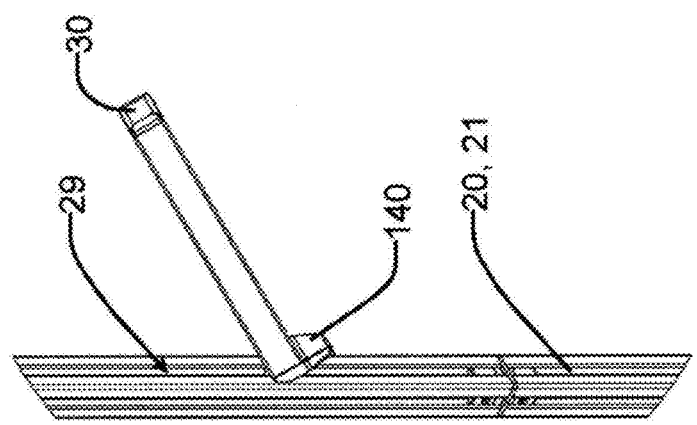
FIG. 5 is a partial front, side perspective view of the rack shown in FIG. 1, wherein a footwear support arm is in an unlocked position in a vertical post.
Figure 4:
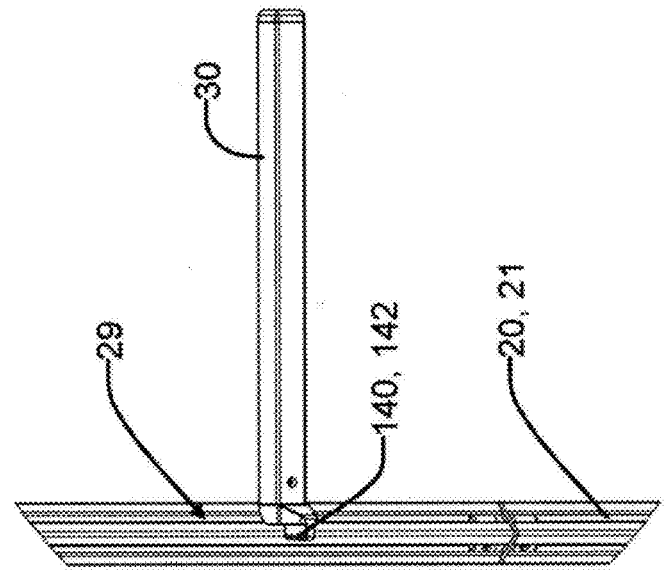
FIG. 4 is a partial front, side perspective view of the rack shown in FIG. 1, wherein a footwear support arm is in an unlocked position in a vertical post.
Figure 7:
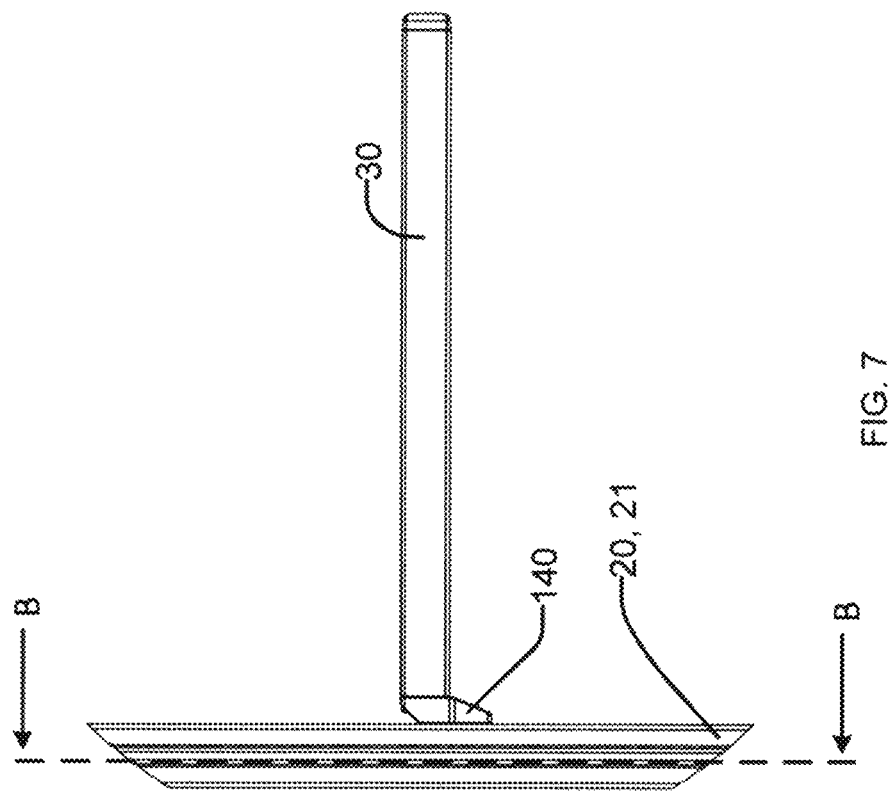
FIG. 7 is a partial front elevation view of the rack shown in FIG. 1, wherein a footwear support arm is in a locked position in a vertical post.
Figure 6:
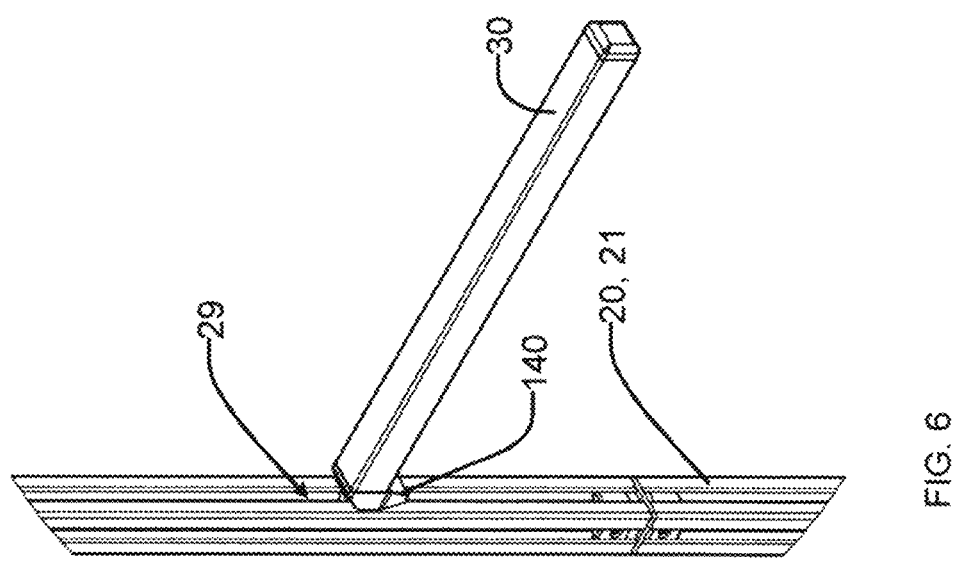
FIG. 6 is a partial front, side perspective view of the rack shown in FIG. 1, wherein a footwear support arm is in a locked position in a vertical post.
Figure 8B:
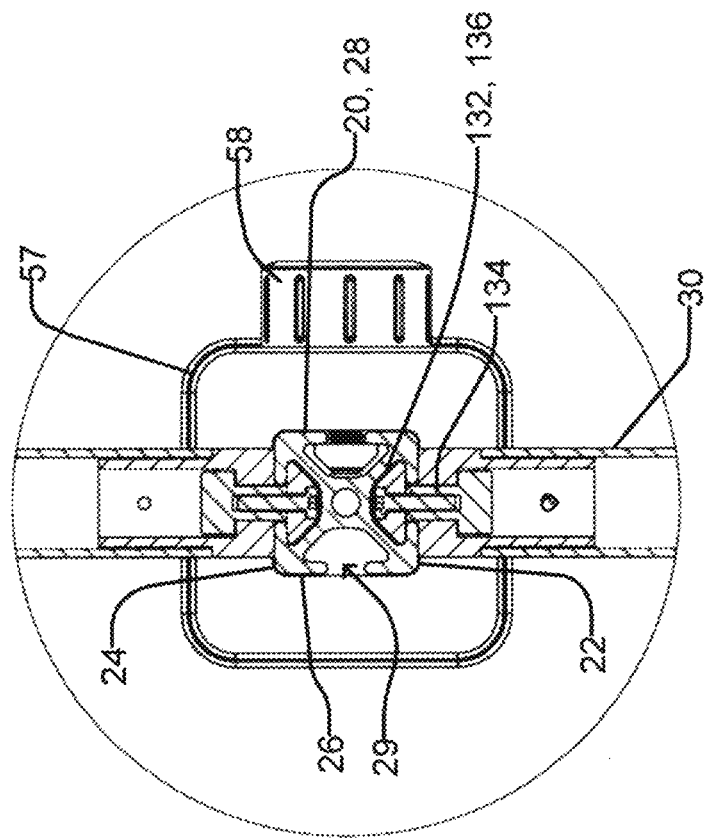
FIG. 8B is a partial cross-sectional view of the rack shown in FIG. 8A taken of section BB.
Figure 8A:
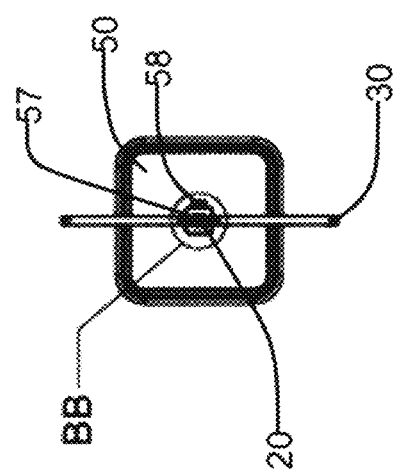
FIG. 8A is a top view of a footwear rack according to an example embodiment of the present invention, wherein a pair of footwear support arms are coplanar.
Figure 12:
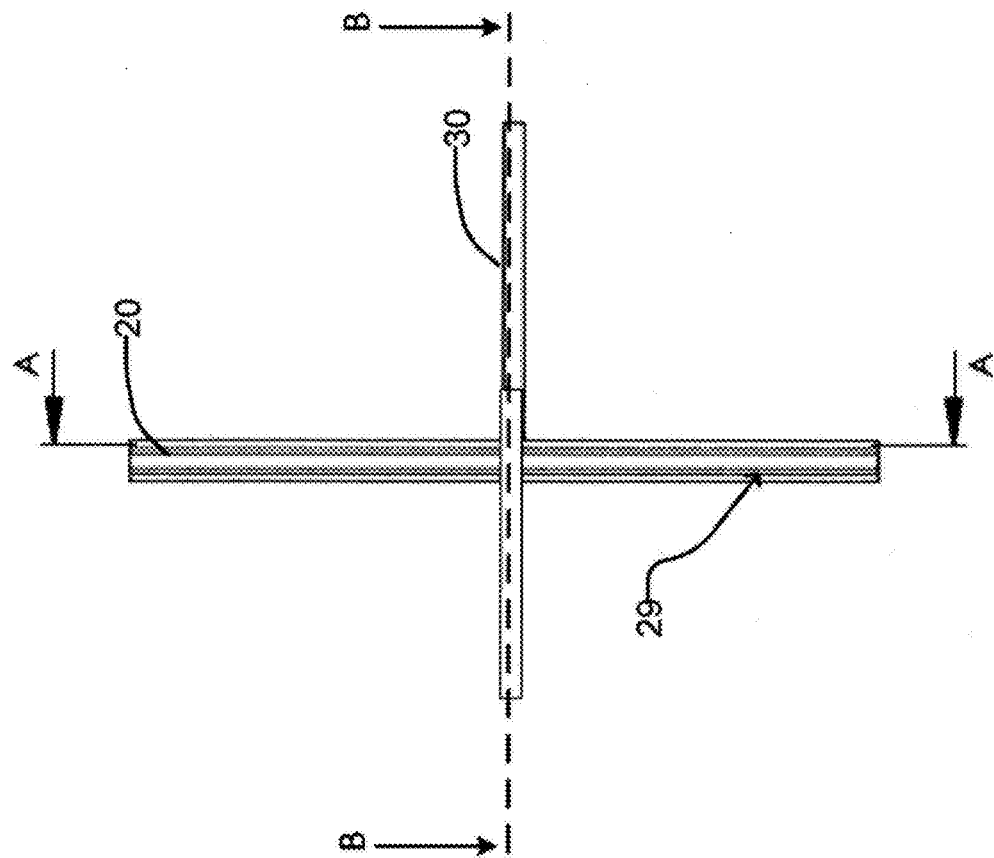
FIG. 12 is a side elevation view of the rack shown in FIG. 11.
Figure 11:
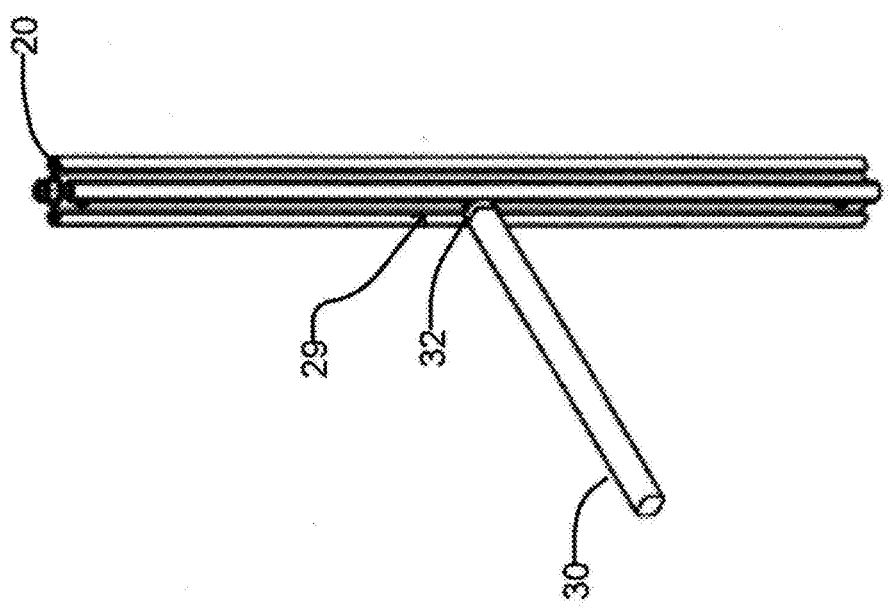
FIG. 11 is a partial front, side perspective view of a footwear rack according to an example embodiment of the present invention.

FIGS. 1-10B, 24, 32A, and 32B illustrate a footwear rack 10 in accordance with an example embodiment. Rack 10 includes a vertical post 20 and a plurality of footwear support arms 30 removably attachable to post 20. When attached to post 20, each footwear support arm 30 extends outwardly away from post 20 in a substantially perpendicular direction to axis 2 of post 20 (FIG. 1). Any number of footwear support arms 30 may be attached to post 20 in any number of positions. In this way, the number and position of footwear support arms 30 may be adjusted depending on the different sizes and quantity of footwear to be stored using rack 10. For example, in the embodiment illustrated in FIG. 1, rack 10 includes five footwear support arms 30 attached to post 20. Footwear support arms 30 are attached to opposed faces 22, 24 of post 20 (FIG. 5). In this way, footwear weight can be distributed about axis 2 and post 20 remains in a vertical, upright position when footwear is stored on rack 10, as described elsewhere herein. Post 20 may have any geometric shape suitable for attaching one or more footwear support arms 30. In the illustrated embodiment, post 20 has a square or rectangular prism geometry and footwear support arms 30 may be attached to one or more of faces 22, 24, 26, 28 (FIG. 8B). For example, in the embodiment illustrated in FIG. 24, rack 10 includes six footwear support arms 30 attached to post 20. Footwear support arms 30 are attached to faces 22, 24, 26. In some embodiments, the geometric shape of post 20 may be a triangular prism, a rectangular prism, a pentagonal prism, a hexagonal prism, an octagonal prism, or otherwise a polygonal prism.

To attach footwear support arms 30 to post 20, each footwear support arm 30 comprises a means for engaging a surface of post 20. In the example embodiment shown in FIGS. 3-10B, each footwear support arm 30 comprises a tongue 132 for engaging a groove 29 defined by a surface of post 20. Groove 29 is configured to matingly engage tongue 132 in a landscape orientation (FIGS. 6, 7, and 10A-10B) to secure footwear support arm 30 to post 20 in a locked position. Tongue 132 comprises a flange 134 outwardly extending from an end of footwear support arm 30 and a connector 136 attached to flange 134. In the illustrated embodiment, connector 136 has a rectangular profile to secure footwear support arm 30 to post 20. As best shown in FIGS. 3, 4, and 9A-9B, connector 136 is inserted into groove 29 in a portrait orientation and, in groove 29, is rotated (clockwise or counterclockwise) 90° to attach footwear support arm 30 to post 20. When rotated 90°, lips 136 of connector 136 engage groove 29 of post 20. In this way, footwear support arm 30 is locked inside groove 29 and secured to post 20 at any desired position along the length of post 20. To detach or unlock footwear support arm 30 from post 20, footwear support arm 30 is rotated (clockwise or counterclockwise) 90°. Footwear support arm 30, in an unlocked position, is withdrawn from groove 29. In this way, footwear support arms 30 can be attached to post 20 at any position along the length of post 20 without the need for further fastening devices to secure footwear support arms 30 to post 20.

Due to the configuration of connector 136 and groove 29, footwear support arm 30 is prevented from sliding up or down post 20 under its own weight or under load when storing footwear. In some embodiments, each footwear support arm 30 comprises a brace 140 to prevent footwear support arm 30 from sliding vertically down post 20 and/or to retain footwear support arm 30 in an orientation that is substantially perpendicular to vertical post 20. Brace 140 extends downwardly from an end of footwear support arm 30. Brace 140 comprises a tongue 142 outwardly extending from the brace for engaging groove 29. In the illustrated embodiment, tongue 142 has a rectangular profile. As best shown in FIGS. 3-5 and 10A-10B, footwear support arm 30 is connected to post 20 by first inserting connector 136 into groove 29 in a portrait orientation. Footwear support arm 30 is rotated (clockwise or counterclockwise) 90° to position tongue 142 in alignment with groove 29. To rotate footwear support arm 30 by 90°, the arm must be pivoted about connector 136 drawing footwear support arm 30 towards post 20 and brace 140 away from post 20 (FIG. 5). To connect footwear support arm 30 to post 20, footwear support arm 30 is positioned to be substantially perpendicular to vertical post 20 by advancing brace 140 towards the post. In this way, tongue 142 engages groove 29 in a portrait orientation (FIGS. 10A-10B).

An alternative mechanism for securing footwear support arms 30 to post 20 is shown in FIGS. 11-17B. Each footwear support arm 30 comprises a tongue 32 for engaging a groove 29 defined by a surface of post 20. Groove 29 is configured to matingly engage tongue 32 in a landscape orientation (FIGS. 16A-16B) to secure footwear support arm 30 to post 20 in a locked position. Tongue 32 comprises a flange 34 outwardly extending from an end of footwear support arm 30 and a connector 36 attached to flange 34. In the illustrated embodiment, connector 36 has a rectangular profile to secure footwear support arm 30 to post 20. As shown in FIGS. 13-15 and 17A-17B, connector 36 is inserted into groove 29 in a portrait orientation and, in groove 29, is rotated (clockwise or counterclockwise) 90° to attach footwear support arm 30 to post 20. When rotated 90°, lips 36a of connector 36 engage channels 29a and rails 29b defined by groove 29 of post 20. In this way, footwear support arm 30 locks inside groove 29 and is secured to post 20 at any desired position along the length of post 20. To detach or unlock footwear support arm 30 from post 20, footwear support arm 30 is rotated (clockwise or counterclockwise) 90°. Footwear support arm 30, in an unlocked position, is withdrawn from groove 29. In this way, footwear support arms 30 can be attached to post 20 at any position along the length of post 20 without the need for further fastening devices to secure footwear support arms 30 to post 20.

Figure 13:
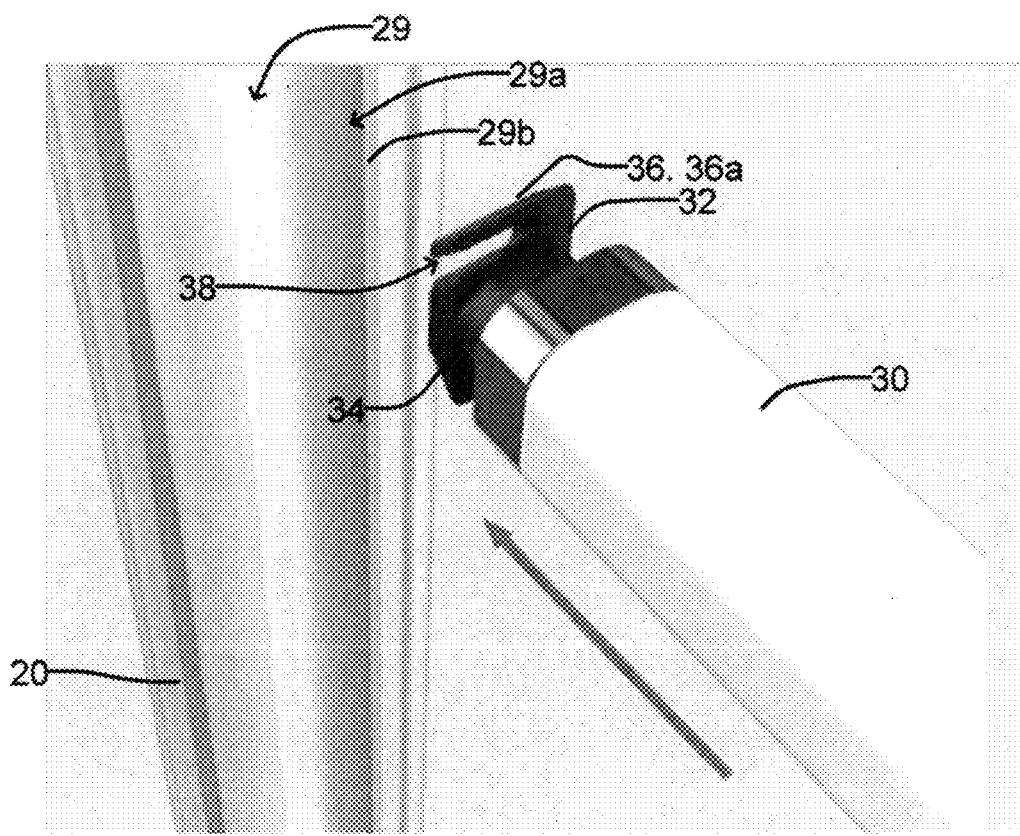
FIG. 13 is a partial front, side perspective view of the rack shown in FIG. 11, wherein a footwear support arm is disconnected from a vertical post.
Figure 14:
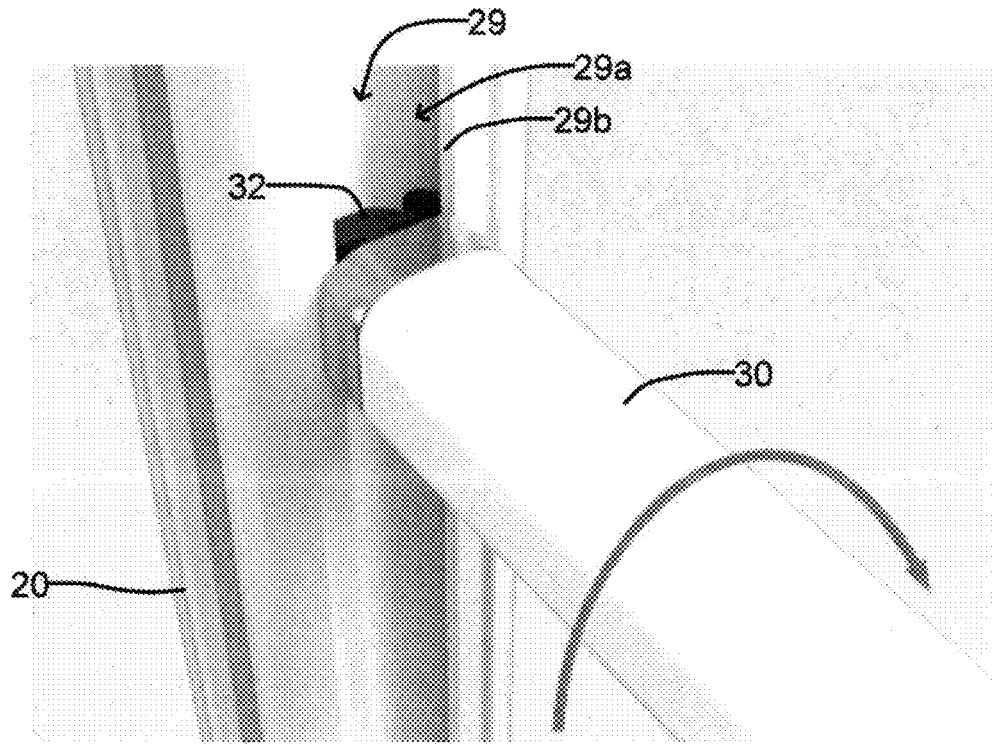
FIG. 14 is a partial front, side perspective view of the rack shown in FIG. 11, wherein a footwear support arm is in a locked position in a vertical post.
Figure 15:
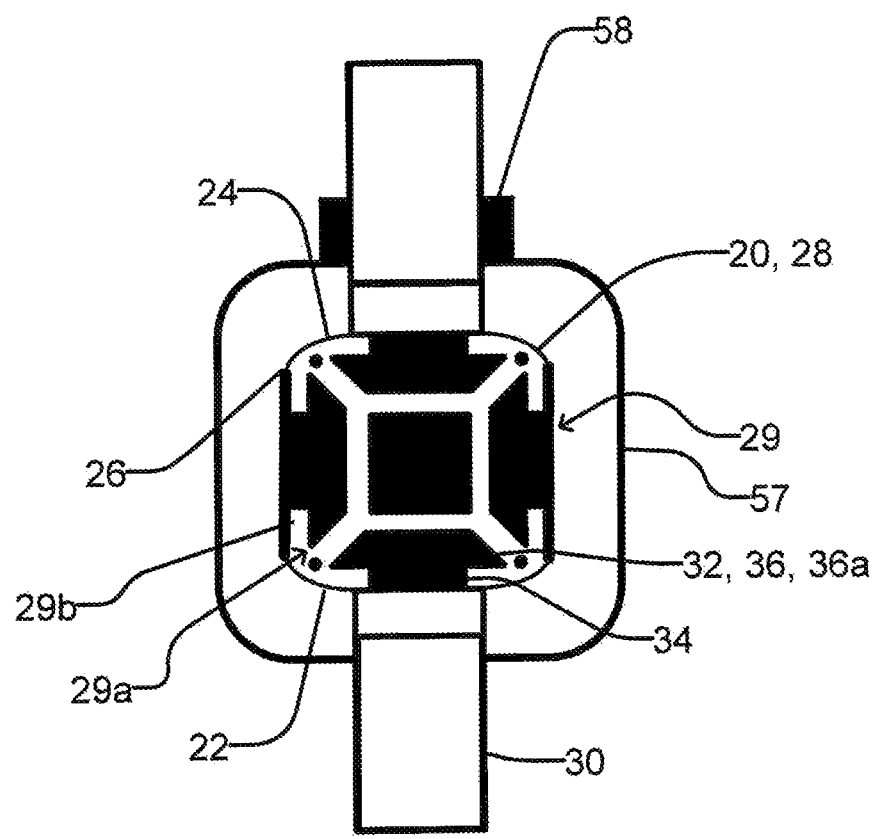
FIG. 15 is a partial cross-sectional view of the rack shown in FIG. 12 taken along the line B-B.
Figures 17A, 17B:
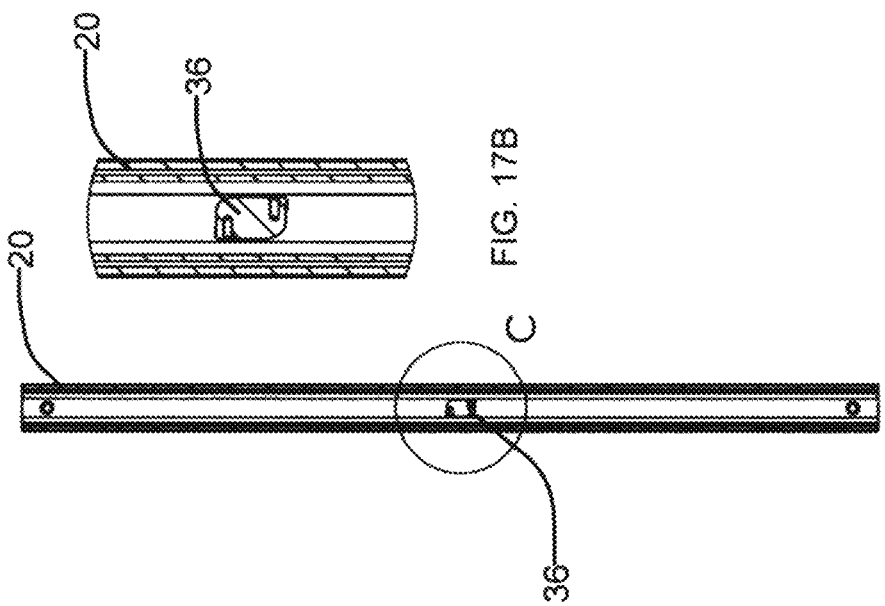
FIG. 17A is a partial cross-section view of the rack shown in FIG. 12 taken along the line A-A, wherein a footwear support arm is in an unlocked position in a vertical post.
FIG. 17B is a partial view of the rack shown in FIG. 17A taken of section C.
Figures 16A, 16B:
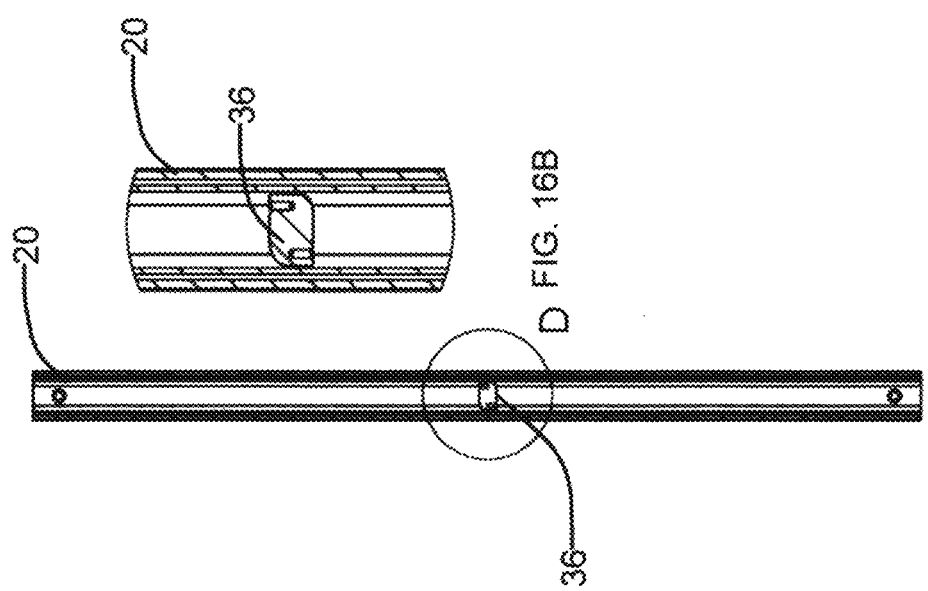
FIG. 16A is a partial cross-sectional view of the rack shown in FIG. 12 taken along the line A-A, wherein a footwear support arm is in a locked position in a vertical post.
FIG. 16B is a partial view of the rack shown in FIG. 16A taken of section D.

Due to the configuration of connector 36, footwear support arm 30 is prevented from sliding up or down groove 29 of post 20 under its own weight or under load when storing footwear. As best shown in FIG. 13, connector 36 comprises a slot 38 adjacent to each lip 36a. In the illustrated embodiment, slots 38 provide connector 36 with an S-shaped configuration. Slots 38 provide an outward spring biasing force to connector 36 when connector 36 is engaged with groove 29 to ensure a tight friction fit between connector 36 and groove 29.

Figure 19:
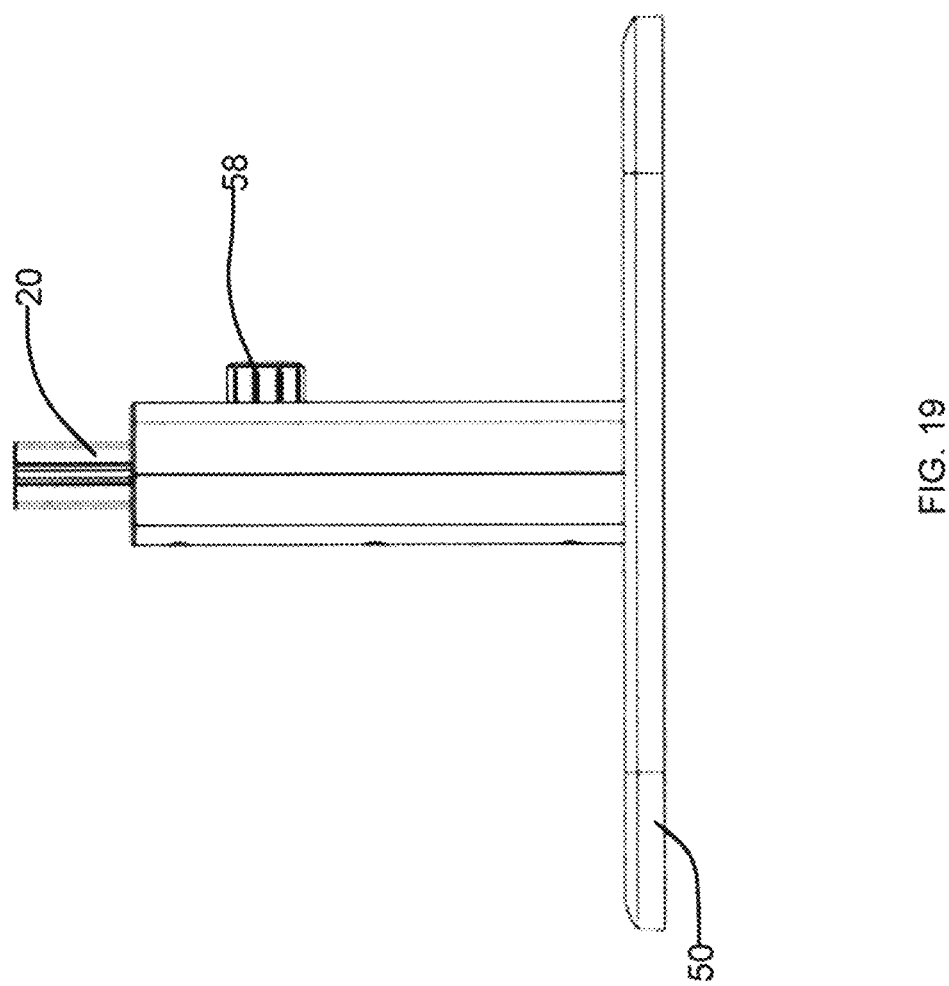
FIG. 19 is a side elevation view of the base shown in FIG. 18.

In some embodiments, rack 10 includes a base 50 for supporting post 20 in an upright, vertical position (FIGS. 18-19). Base 50 includes an area 52 for footwear to be placed on (e.g. to dry before hanging) and a support 57 secured to area 52 for receiving post 20. Support 57 may include a mechanism 58 for adjusting the height of rack 10. Support 57 receives post 20 therein and mechanism 58 is used to adjust the height of rack 10 to accommodate the height of, for example, a closet rail 70 (FIG. 23). Mechanism 58 may be used to move post 20 vertically within support 57 to adjust the height of rack 10 by an amount about equal to the length of support 57. In some embodiments, mechanism 58 may be used to adjust the height of rack 10 by about 1 inch to about 12 inches.

Figure 20:
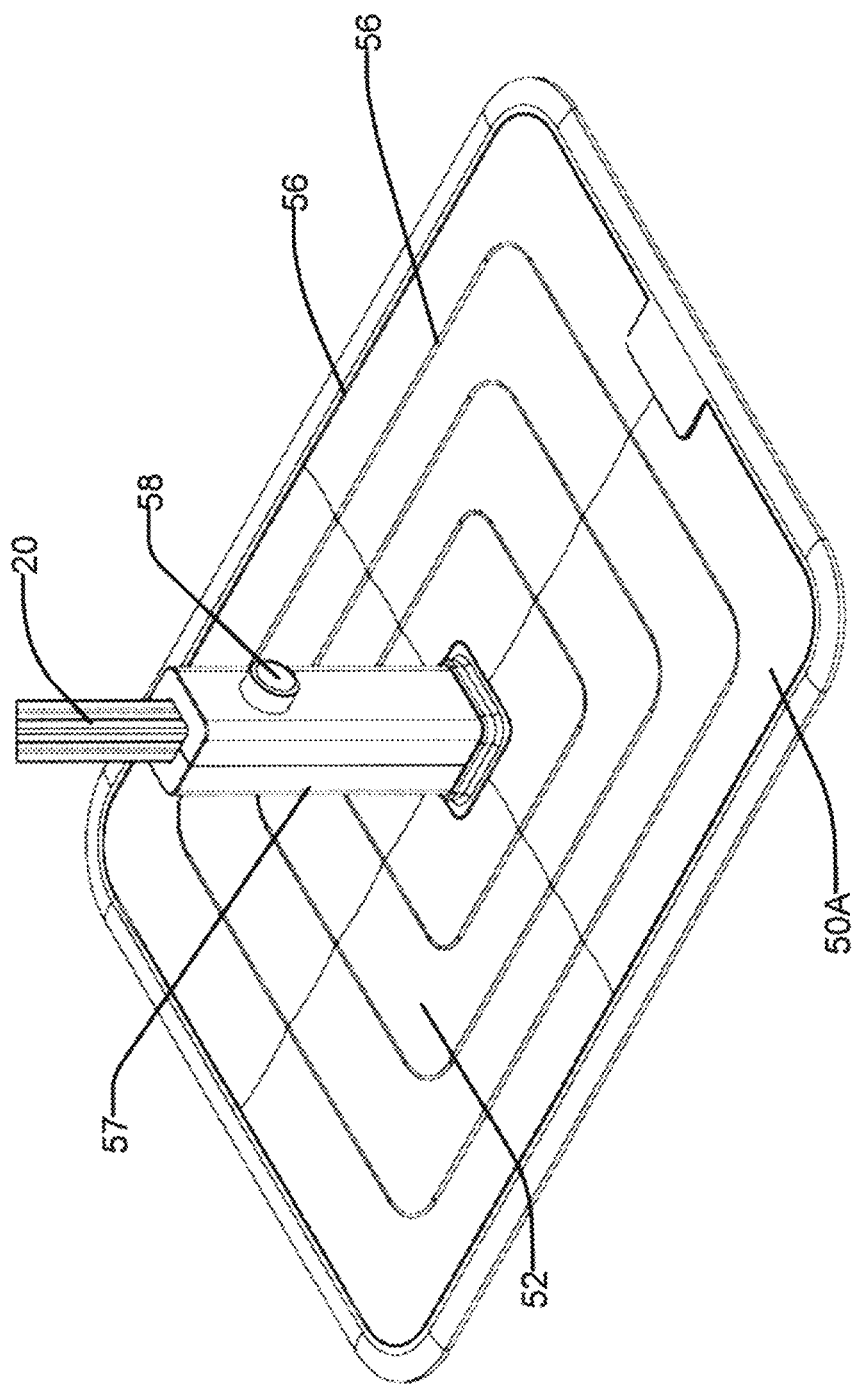
FIG. 20 is a front, side perspective view of a base of a footwear rack according to an example embodiment of the present invention.

In some embodiments, base 50 includes a removable rubber mat 54 (FIG. 18). Mat 54 may be removed from base 50 for cleaning. In some embodiments, an upper surface of base 50 includes a gripped texture (not shown) to grip articles placed thereon. An alternative base design (i.e. base 50A) is shown in FIG. 20. Many features and components of base 50A are similar to features and components of base 50, with the same reference numerals being used to indicate features and components that are similar between the embodiments. In example embodiment illustrated in FIG.

20, base 50A includes one or more moisture gutters 56 for collecting water from articles placed on area 52 and/or rubber mat 54.

Figure 21:
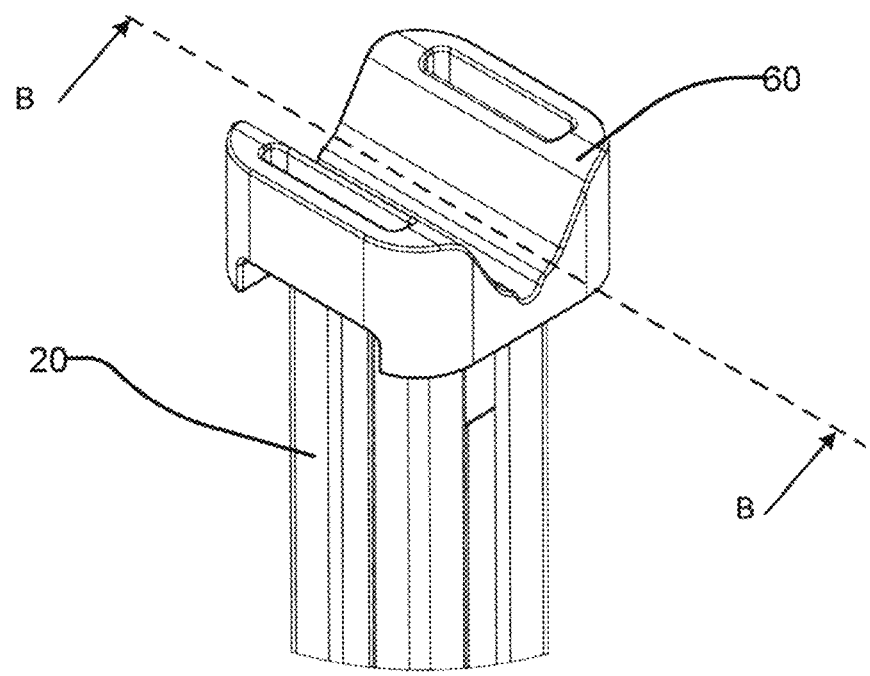
FIG. 21 is a partial top, front, side perspective view of an end cap of the rack shown in FIG. 1.
Figure 22:
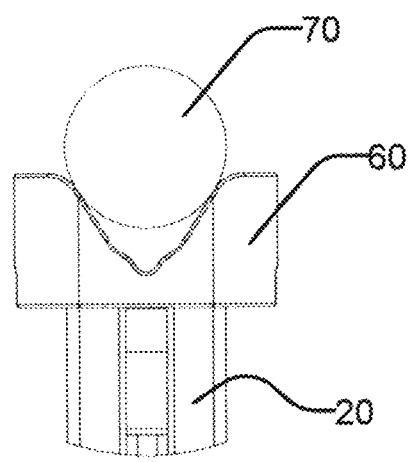
FIG. 22 is a cross-sectional view of the end cap shown in FIG. 21 taken along the line B-B, wherein the end cap is engaging a closet rail.

In some embodiments, post 20 is configured to engage a conventional closet rail for securing post 20 in an upright, vertical position. For example, post 20 may include a concave end or a concave end cap 60 (FIGS. 21 and 22) attached to an end of post 20 for engaging a horizontal closet rail. As shown in FIG. 22, end cap 60 is configured to engage the circular profile of a closet rail 70. When rack 10 is installed in a vertical, upright position, end cap 60 frictionally engages rail 70 and provides stability to rack 10.

Figure 24:
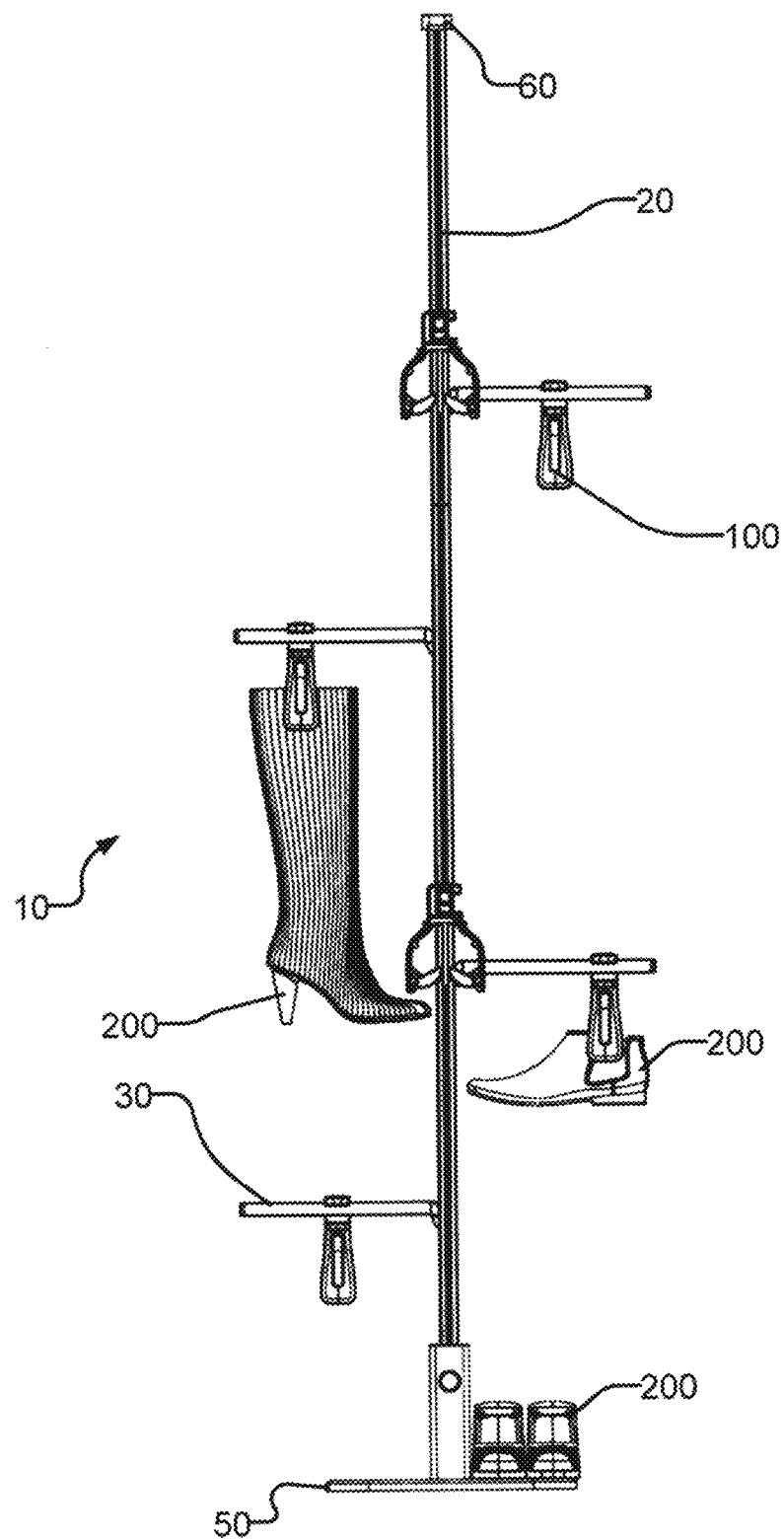
FIG. 24 is a front elevation view of a footwear rack according to an example embodiment of the present invention, wherein various articles of footwear 200 hang from footwear support arms and rest on a base of the rack.

FIG. 23 shows a rack 10 installed to fit a closet rail 70 of a custom closet. The height of rack 10 may be adjusted to accommodate the height of the closet rail or to suit the needs of the storage application. In some embodiments, to customize the height of rack 10, post 20 may be constructed from a plurality of pieces which fasten together. In some other embodiments, post 20 is of unitary construction and the length of post 20 is predetermined based on the needs of the desired application. In this way, rack 10 may be prefabricated and installed to fit a closet of known dimensions. FIG. 24 shows a freestanding rack 10. A number of footwear articles are hung from footwear support arms 30 and stored on area 52 of base 50.

Figure 25:
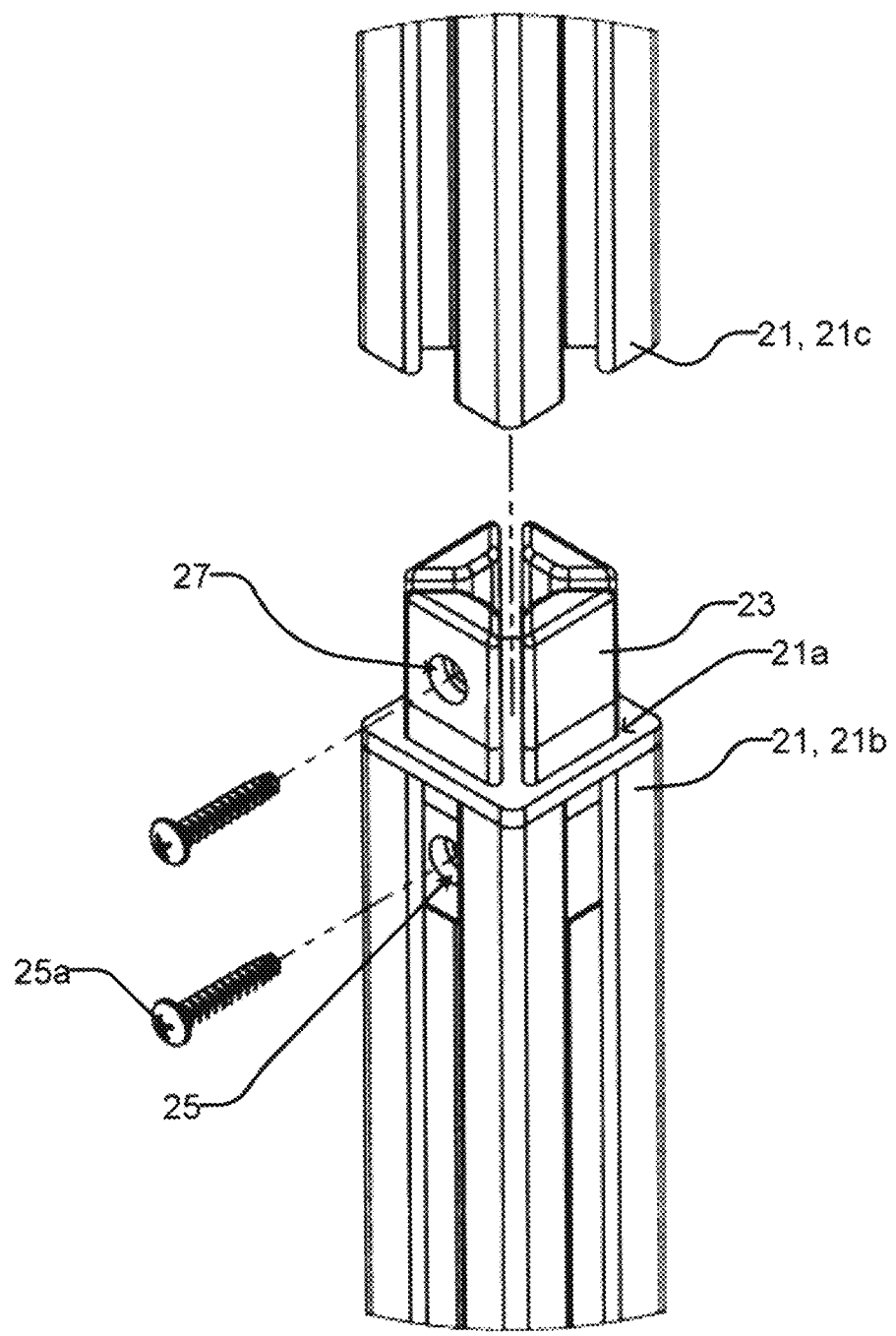
FIG. 25 is a partial exploded perspective view of a vertical post of a footwear rack according to an example embodiment of the present invention.

To customize rack 10 to accommodate existing storage space (e.g. a closet) of known dimensions, rack 10 may be constructed from modular pieces. For example, FIG. 25 illustrates a post 20 in accordance with an example embodiment. Post 20 comprises a plurality of pieces 21 connectable using a pin 23. Each piece 21 comprises a channel 21a extending fully or partially therethrough along axis 2. Pin 23 is configured to frictionally fit inside channel 21a for engaging and fastening two pieces 21 together end to end. To fasten two pieces 21 together, pin 23 is inserted into channel 21a of a first piece 21b such that a portion of pin 23 remains outside of channel 21a of the first piece. With pin 23 engaged within a first piece 21b, pin 23 is then inserted into channel 21a of a second piece 21c. In some embodiments, each piece 21 may be secured to pin 23 using a screw 25a. To engage screw 25a, each piece 21 has an aperture 25 adjacent to an end thereof. Pin 23 has a pair of apertures 27 configured to align with apertures 25 of pieces 21 when pieces 21 are fastened together using pin 23.

Each piece 21 may have any geometric shape suitable for attaching one or more footwear support arms 30 to post 20, as described elsewhere herein. In the illustrated embodiment, piece 21 has a square or rectangular prism geometry and footwear support arms 30 may be attached to one or more of its four faces. In some other embodiments, the geometric shape of post 20 may be a triangular prism, a rectangular prism, a pentagonal prism, a hexagonal prism, a octagonal prism, or otherwise an polygonal prism. Footwear support arms 30 may be attached to one or more pieces 21 as described elsewhere herein with respect to post 20.

Figure 28:
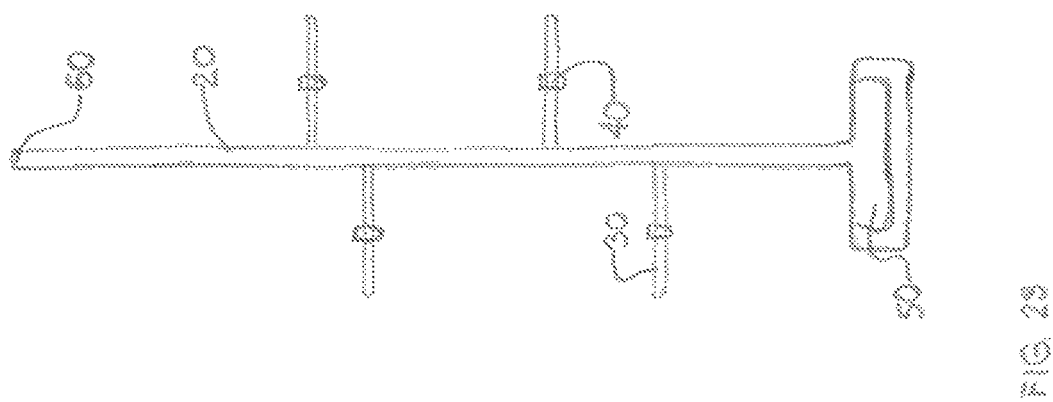
FIG. 28 is a perspective view of a clasp according to an example embodiment of the present invention.
Figure 26B:
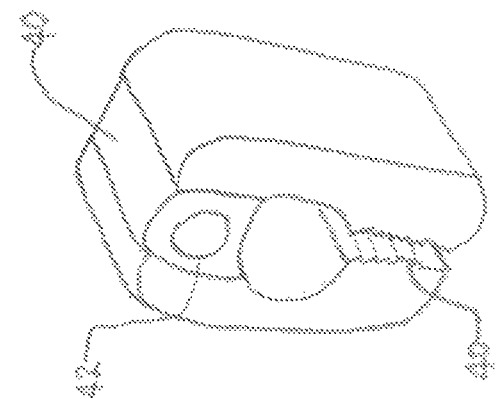
FIG. 26B is a perspective view of the clasp shown in FIG. 26A in a closed position.
Figure 26A:
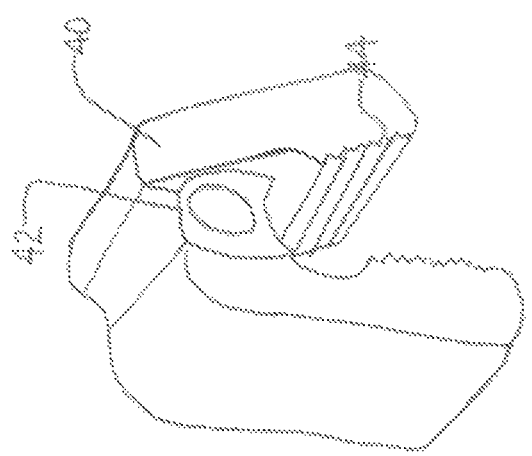
FIG. 26A is a perspective view of a clasp according to an example embodiment of the present invention, wherein the clasp is in an open position.
Figure 27:
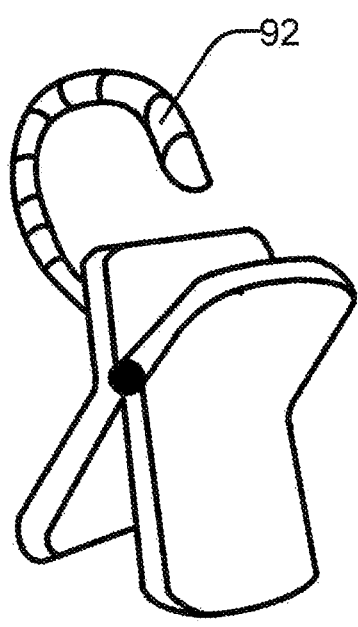
FIG. 27 is a perspective view of a clasp according to an example embodiment of the present invention.
Figure 28:
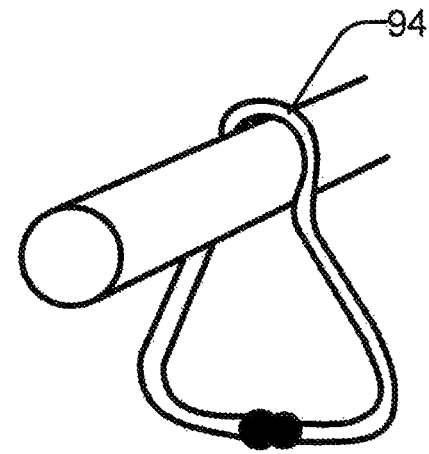
Figure 29:
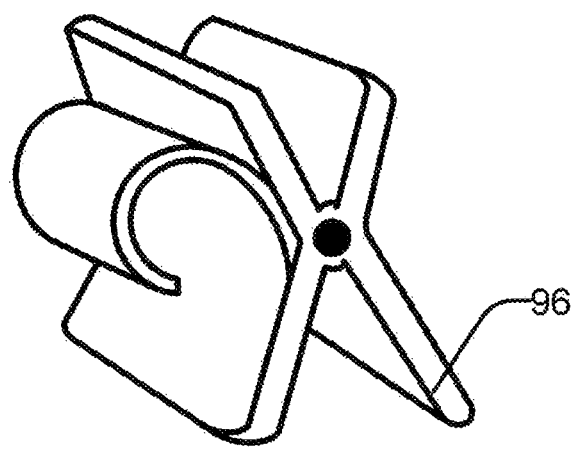
FIG. 29 is a perspective view of a clasp according to an example embodiment of the present invention.

To store one or more articles of footwear, rack 10 includes a plurality of clasps. Each clasp removably attaches to footwear support arm 30 and is capable of securely gripping a variety of footwear. FIGS. 26A and 26B illustrate a clasp 40 according to an example embodiment. Clasp 40 is C-shaped. To store an article of footwear, clasp 40 is pivoted into an open position about hinge 42 and is advanced over a top surface of footwear support arm 30 (FIG. 26A). Clasp 40 is then aligned to grip the article of footwear and is pivoted into a closed position (FIG. 26B). In the closed position, the article of footwear is securely held by clasp 40 and stored on rack 10. In the illustrated embodiment, clasp 40 includes teeth 44 for securely gripping the article of footwear without damaging materials or zippers or other fasteners or embellishments. In some embodiments, teeth 44 comprise an elastomeric material such as silicone, etc. Alternative clasp designs 92, 94, 96, 100 are shown in FIGS. 27-29.

FIGS. 30A-32B illustrate a clasp 100 according to an example embodiment. Clasp 100 comprises a hook 110 for removably attaching the clasp to footwear support arm 30. In some embodiments, hook 110 defines an opening 112 that is configured to friction fit and engage an outer surface of footwear support arm 30. For example, in the FIGS. 30A-32B embodiment, hook 110 defines an opening 112 having a square or rectangular cross-section in a longitudinal plane of the clamp that is configured to friction fit and engage a support arm (e.g. support arm 30) having a square or rectangular prism geometry. Hook 110 may define an opening having a configuration suitable for friction fitting and engaging a support arm having any geometric shape (e.g. a triangular prism, a rectangular prism, a pentagonal prism, a hexagonal prism, a octagonal prism, or otherwise a polygonal prism).

Clasp 100 comprises a plurality of arms 120 extending downwardly away from hook 110 for holding footwear. To securely grip footwear, clasp 100 further comprises at least one tong 130. Tong 130 is pivotally secured to arm 120 and is configured to span an opening 122 defined by adjacent arms 120. In the embodiment illustrated in FIGS. 30A-32B, clasp 100 comprises three coplanar arms 122, 124. Tong 130 is pivotally secured to each outside arm 122 via a hinge 131. Each tong 130 is configured to span opening 122 defined by outside arm 122 and adjacent inside arm 124.

Figure 32A:
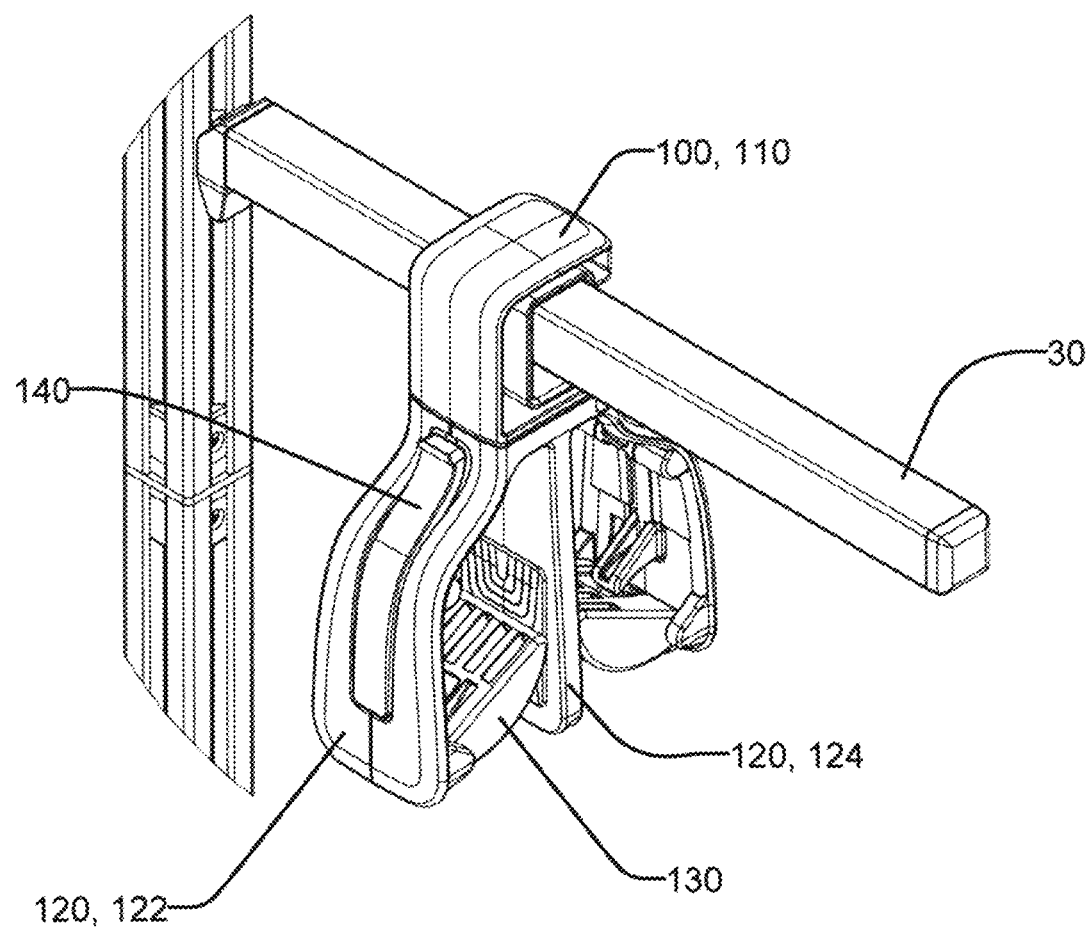
FIG. 32A is a partial front, side perspective view of the rack shown in FIG. 1, wherein a clasp is in a closed position.
Figure 32B:
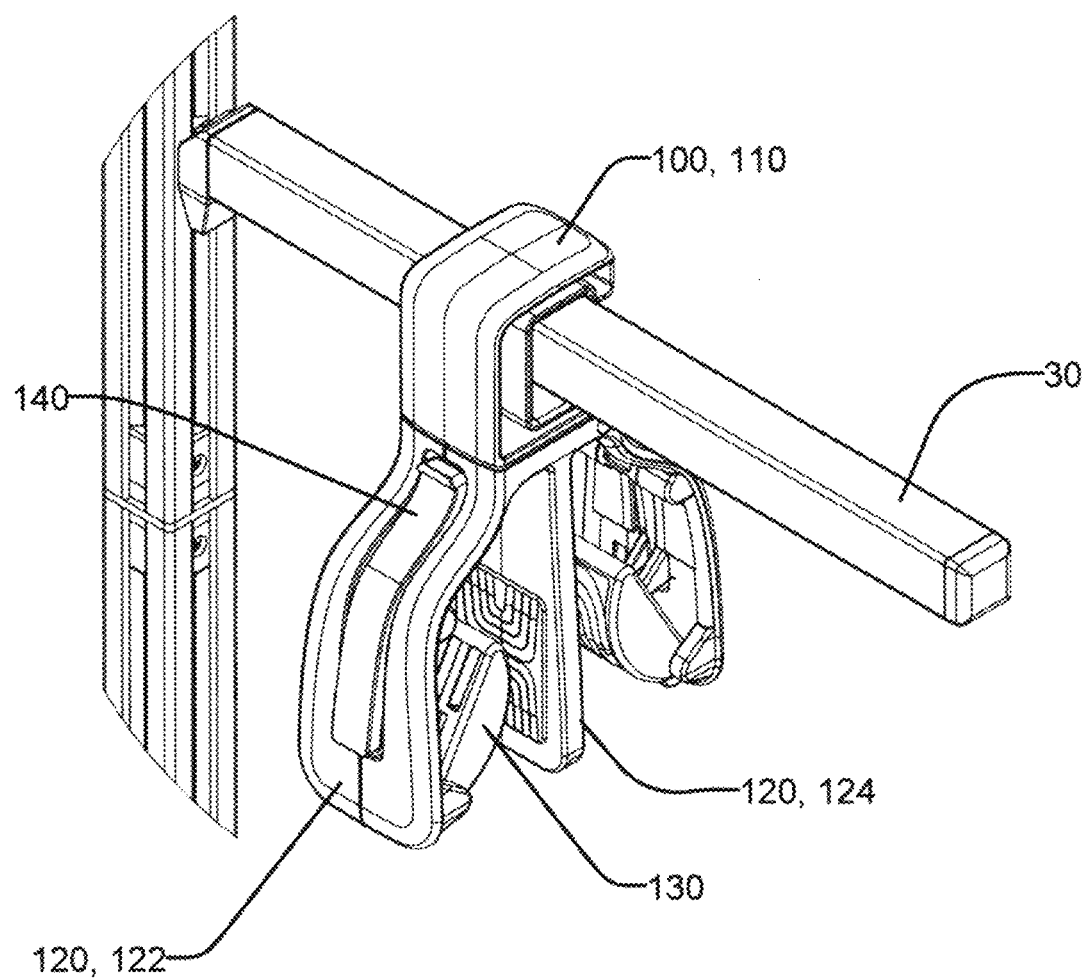
FIG. 32B is a partial front, side perspective view of the rack shown in FIG. 1, wherein a clasp is in an open position.

Clasp 100 is interchangeable between a closed position (FIGS. 30A, 31A, and 32A) and an open position (FIGS. 30B, 31B, and 32B). In the closed position, tong(s) 130 extends between adjacent arms 120 (e.g. arms 122, 124) to traverse opening 122. In the closed position, tong(s) 130 abuts against and contacts the adjacent arm (e.g. arm 124) to secure an article of footwear between the tong and the adjacent arm via a biasing force (e.g. a gravitational force). In some embodiments, the biasing force exerted by tong 130 on an article of footwear is increased proportionally as the weight of the article held by clasp 100 increases. In other words, the applied force is a function of a weight of the footwear article. No more force is applied by tong 130 than is needed to hang an article of footwear. In the open position, tong(s) 130 is pivotally retracted from the adjacent arm (e.g. arm 124) to bring tong(s) 130 towards the arm it is pivotally secured to (e.g. arm 122). To store an article of footwear, clasp 100 is pivoted into an open position. In the open position, clasp 100 is aligned to grip the article of footwear. Clasp 100 is then pivoted into the closed position to securely grip the article of footwear and store the footwear on rack 10. The force applied by tong 130 to an article of footwear to be hung is dispersed along an end 130a of tong 130 opposed to hinge 131 (FIGS. 31A-31B). In some embodiments, the force applied by tong 130 is a function of the weight of a spring (not shown) used to bias tong 130 in the closed position. The weight of the spring is based on the wire size, outer diameter, number of coils, and/or density of wire of the spring.

In the embodiment illustrated in FIGS. 30A-32B, clasp 100 includes a locking mechanism for securing clasp 100 in the open position and/or the closed position. In the embodiment illustrated in FIGS. 30A-32B, clasp 100 comprises a locking mechanism 140. Locking mechanism 140 comprises a button that is toggled or pushed to secure clasp 100 in the open position and/or the closed position, as described elsewhere herein.

In the embodiment illustrated in FIGS. 30A-32B, tong 130 includes an elastomeric pad 132 for securely gripping the article of footwear without damaging materials or zippers or other fasteners or embellishments. Tong 130 contacts an elastomeric pad 126 coupled to the adjacent arm (e.g. arm 124) to provide further protection to the article of footwear. In some embodiments, pads 126, 132 comprise an elastomeric material such as silicone, etc. In some embodiments, clasp 100 includes elastomeric pad 126 or 132, but not both. In some embodiments, no elastomeric pad is provided.

In some embodiments, arms 120 are rotatable about hook 110. For example, coplanar arms 122, 124 may be rotated 360° about axis 102 (FIGS. 31A-31B). In this way, an article of footwear secured to clasp 100 may be easily accessed and removed from rack 10.

In some embodiments, rack 10 and the components thereof are injection moulded or made of extruded aluminum. Persons skilled in the art will recognize that any suitably rigid and resilient material capable of supporting the weight of multiple pairs of footwear may be used. For example, rack 10 and the components thereof may be made of one or more of aluminum or other metal or metal alloy, plastic, and natural fiber such as wood.

Persons skilled in the art will recognize that the racks disclosed herein may be used to store footwear or any other articles for which storage is desired (e.g. hats, belts, non-clothing items, etc.). The racks discloses herein may be installed inside a closet and supported in an upright position using a closet rail, as disclosed elsewhere herein, or may be supported in an upright position by only a base or may be attached to a wall for additional support.

INTERPRETATION OF TERMS

Unless the context clearly requires otherwise, throughout the description:
- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof; elements which are integrally formed may be considered to be connected or coupled;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description, depend on the specific orientation of the apparatus described and illustrated. The subject matter described herein may assume various alternative orientations. Accordingly, these directional terms are not strictly defined and should not be interpreted narrowly.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

While a number of exemplary aspects and embodiments are discussed herein, those of skill in the art will recognize certain modifications, permutations, additions and sub-combinations thereof.

What is claimed is:

1. A clasp comprising:
   a hook;
   a plurality of coplanar arms downwardly extending from the hook; and
   at least one tong, the tong pivotally coupled to a first coplanar arm and extendable across an opening defined by the first coplanar arm and an adjacent second coplanar arm to engage the second coplanar arm;
   wherein the clasp is interchangeable between an open position and a closed position by pivoting the tong across the opening, wherein in the open position the clasp may be aligned to secure an article to be hung and in the closed position the tong secures the article to the second coplanar arm using a biasing force; and
   further comprising a locking mechanism for securing the clasp in the open position and/or the closed position.

2. A clasp comprising:
   a hook;
   a plurality of coplanar arms downwardly extending from the hook; and
   at least one tong, the tong pivotally coupled to a first coplanar arm and extendable across an opening defined by the first coplanar arm and an adjacent second coplanar arm to engage the second coplanar arm,
   wherein the coplanar arms may be rotated 360° about a longitudinal axis defined by the hook.

3. A footwear rack comprising:
   a vertical post supporting a plurality of removeable footwear support arms, each footwear support arm extending in a direction that is generally perpendicular to a longitudinal axis defined by the post; and
   a plurality of clasps according to claim 2, each clasp removably attachable to the footwear support arms.

4. The rack according to claim 3, wherein the post comprises a plurality of modular and interconnectable pieces for adjusting the height of the rack.

5. The rack according to claim 3, further comprising a base defining a support for receiving the post, wherein the support includes a mechanism for adjusting the height of the rack by moving the post vertically within the support.

6. The rack according to claim 3, wherein each footwear support arm comprises a tongue extending from an end thereof, the tongue configured to engage a groove defined by and extending longitudinally along at least one surface of the post.

7. The rack according to claim 6, wherein each footwear support arm is secured to the post by inserting the tongue inside the groove and rotating the footwear support arm 90° to engage the tongue and groove and secure the footwear support arm to the post in a locked position.

8. The rack according to claim 7, wherein the connector has an S-shaped configuration and the slots defined by the connector provide an outward spring biasing force to the connector when the footwear support arm is engaged with the post in the locked position.

9. The rack according to claim 6, wherein each footwear support arm is securable at any position along the length of the post.

10. The rack according to claim 3, further comprising an end cap configured to engage a closet rail to secure the post in an upright, vertical position.

11. The rack according to claim 3, wherein the biasing force exerted by the tong on the article is increased proportionally as the weight of the article increases.

* * * * *